United States Patent
Sherman

(10) Patent No.: US 7,629,960 B2
(45) Date of Patent: Dec. 8, 2009

(54) INPUT DEVICE WITH JOYSTICK MODE AND POINTING MODE

(75) Inventor: Nathan C. Sherman, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 495 days.

(21) Appl. No.: 11/158,616

(22) Filed: Jun. 22, 2005

(65) Prior Publication Data

US 2006/0290664 A1 Dec. 28, 2006

(51) Int. Cl.
*G06G 3/033* (2006.01)
(52) U.S. Cl. ....................... 345/163; 345/161
(58) Field of Classification Search ........... 345/156, 345/157, 161, 163, 164, 166, 167, 173, 184
See application file for complete search history.

(56) References Cited

U.S. PATENT DOCUMENTS

| | | | |
|---|---|---|---|
| 5,530,455 A | 6/1996 | Gillick et al. | |
| 5,912,661 A | 6/1999 | Siddiqui | |
| 6,075,518 A | 6/2000 | Pruchniak | |
| 6,097,371 A | 8/2000 | Siddiqui et al. | |
| 6,128,006 A | 10/2000 | Rosenberg et al. | |
| 6,281,881 B1 | 8/2001 | Siddiqui et al. | |
| 6,300,936 B1* | 10/2001 | Braun et al. | 345/156 |
| 6,353,429 B1 | 3/2002 | Long | |
| 6,380,927 B1 | 4/2002 | Ostrum et al. | |
| 6,480,184 B1* | 11/2002 | Price | 345/163 |
| 6,697,043 B1* | 2/2004 | Shahoian | 345/156 |
| 6,784,870 B2* | 8/2004 | Yin | 345/156 |
| 2002/0067336 A1* | 6/2002 | Wegmuller et al. | 345/156 |
| 2002/0140665 A1* | 10/2002 | Gordon | 345/156 |
| 2003/0214484 A1* | 11/2003 | Haywood | 345/163 |

OTHER PUBLICATIONS

"BTC 9019URF Wireless Multimedia USB Keyboard with Dual Mode Joystick Mouse" specification sheet, printed in Taiwan 2003 (1 page).
"BTC 9116URF Wireless Internet USB Keyboard with Dual Mode Joystick Mouse" specification sheet, printed in Taiwan 2003 (1 page).

* cited by examiner

*Primary Examiner*—Chanh Nguyen
*Assistant Examiner*—Pegeman Karimi
(74) *Attorney, Agent, or Firm*—Merchant & Gould P.C.

(57) ABSTRACT

An input device having a pointing mode and a joystick mode is disclosed. The input device includes a housing, a tracking assembly, and at least one actuator. In some aspects of the invention, a controller is located within the housing to receive input from the tracking assembly and the actuator, and the controller transmits a pointing device recognition signal and a joystick device recognition signal to a host upon connection of the input device to the host. In another aspect of the invention, the actuator may be utilized to switch between a repeat and center mode, wherein the input device repeats a joystick signal when in the pointing mode and the hold mode. Additional aspects of the present invention relate to systems, methods, and computer-readable media with computer executable instructions.

13 Claims, 5 Drawing Sheets

INPUT DEVICE WITH JOYSTICK MODE AND POINTING MODE

BACKGROUND

A conventional computing environment is optimized to accept input from one or more discrete input devices. Examples of input devices include (a) various pointing devices, such as a mouse, trackball, and touchpad; (b) a keyboard; (c) a joystick device; (d) and a stylus. Many software applications are utilized most efficiently when a combination of input devices are employed by an operator. For example, an operator utilizing a conventional word processing application, spreadsheet application, or browser application may employ a keyboard to enter characters (i.e., text, numerals, and symbols) and also employ a pointing device to control the position of a pointer image on a display screen and manipulate data or navigate through various menus, buttons, and links.

Another example of a scenario in which a combination of input devices are employed by an operator involves gaming applications. In certain classes of gaming applications, both a pointing device and a joystick device are utilized to control movements of a character or a virtual environment. For example, the pointing device may be utilized to control a direction that the character is facing in the virtual environment, and the joystick device may be utilized to control the position of a character in the virtual environment. By manipulating the pointing device, the operator will control whether the character looks upward, downward, or to the left or right in the virtual environment. Similarly, by manipulating the joystick device, the operator will control positioning of the character relative to objects and other characters in the virtual environment.

Operators generally employ one of two methods to utilize both a pointing device and a joystick device for gaming applications. A first method involves using the pointing device and the joystick device interchangeably. That is, the operator will solely use the pointing device to control actions of the character. When the operator desires to movement of the character, however, the pointing device is set aside and the joystick device is solely utilized. Disadvantages to this method are that time is expended in switching between the input devices and the ability to control one of the input devices is surrendered. A second method involves using the pointing device and the joystick device simultaneously. That is, the operator will use one hand to manipulate the pointing device, and the operator will use another hand to manipulate the joystick device. Although this method overcomes the disadvantages of the first method, dexterity beyond the ability of some operators is required to manipulate two input devices simultaneously.

SUMMARY

One aspect of the invention is an input device having a housing, a tracking assembly, an actuator, and a controller. The housing forms at least a portion of an exterior of the input device. The tracking assembly is at least partially located within the housing. The actuator is accessible from the exterior of the input device. The controller is located within the housing to receive input from the tracking assembly and the actuator. In addition, the controller transmits a pointing device recognition signal and a joystick device recognition signal to a host upon connection of the input device to the host.

Another aspect of the invention is an input device having a housing, a tracking assembly, a first actuator, and a second actuator. The housing forms at least a portion of an exterior of the input device. The tracking assembly is at least partially located within the housing. The first actuator is accessible from the exterior of the input device and switches the input device between a pointing mode and a joystick mode. The input device transmits a pointing device signal when in the pointing mode and a joystick signal when in the joystick mode. The second actuator is accessible from the exterior of the input device and switches the input device between a center mode and a hold mode. The input device transmits a zero vector for the joystick data when in the center mode and switched from the joystick mode to the pointing mode.

Yet another aspect of the invention is a method that includes receiving a first signal that is one of a center signal and a hold signal. A joystick vector signal is received and operated upon to move an object in a virtual environment. The method also includes receiving a device switch signal and (1) continuing to operate upon the joystick vector signal to move the object in the virtual environment if the first signal is the hold signal or (2) ceasing to operate upon the joystick vector signal if the first signal is the center signal. In addition, the method includes receiving a pointing vector signal and operating upon the pointing vector signal to change a view of the virtual environment.

The advantages and features of novelty characterizing the invention are pointed out with particularity in the appended claims. To gain an improved understanding of the advantages and features of novelty, however, reference may be made to the following descriptive matter and accompanying drawings that describe and illustrate various embodiments and concepts related to the invention.

DESCRIPTION OF THE DRAWINGS

The foregoing Summary, as well as the following Detailed Description, will be better understood when read in conjunction with the accompanying drawings.

DETAILED DESCRIPTION

Introduction

Figure 1:
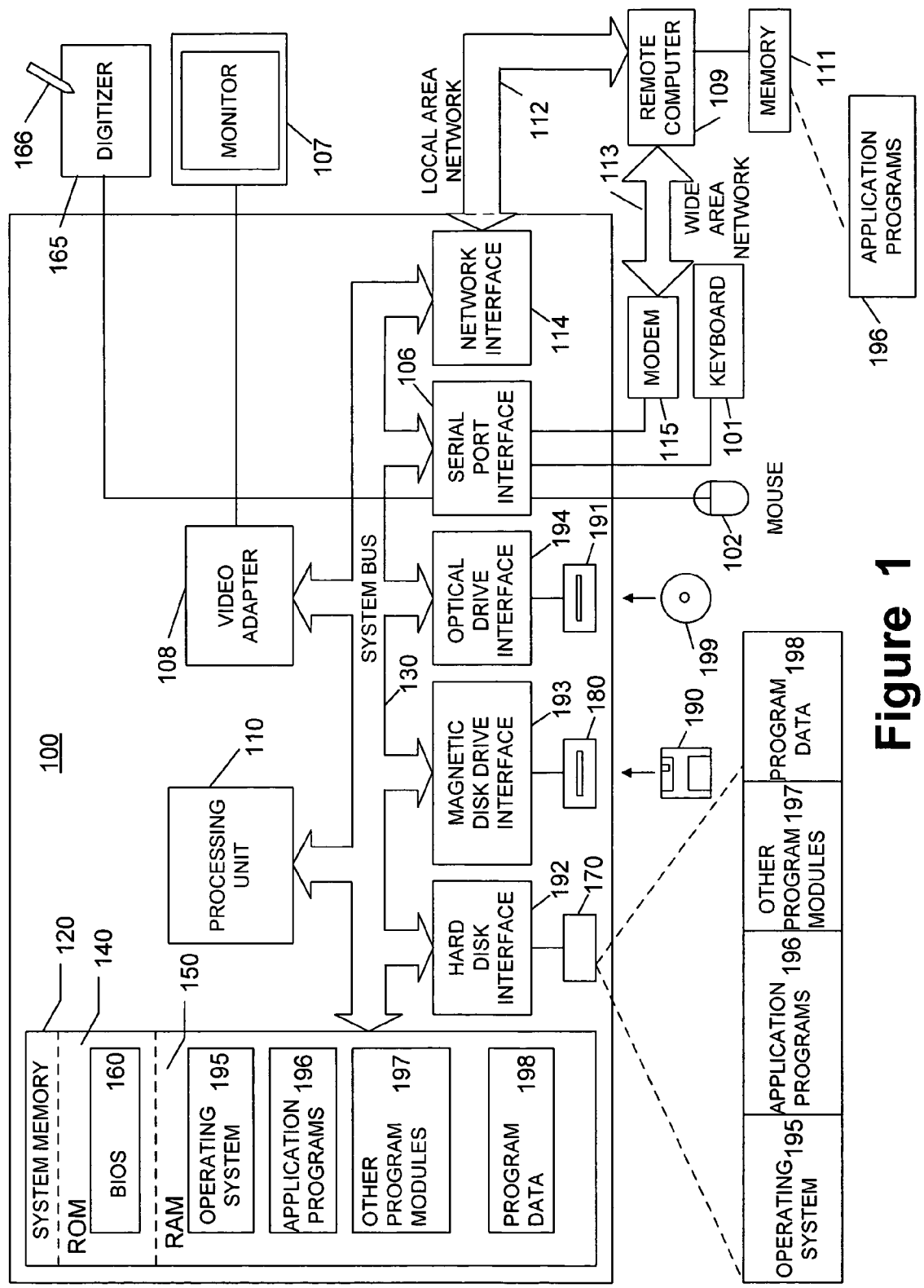
FIG. 1 is a schematic diagram of a general-purpose digital computer operating environment in which various aspects of the invention may be implemented.

Pointing devices, such as a mouse, trackball, or touchpad, are often utilized to move pointer images on a display screen, manipulate data, or navigate through various menus, buttons, or links. Pointing devices may also be utilized to control movements in gaming applications, such as the actions of a character or the view of a virtual environment. In certain classes of gaming applications, both a pointing device and a joystick device may be utilized to control movements of the character or virtual environment. Various aspects of the invention relate to a pointing device, such as a mouse or trackball pointing device, that operates in a pointing mode and a joystick mode.

The pointing device may be utilized in the pointing mode to transmit signals in the form of pointing data. That is, a host will receive signals that are processed as pointing data. The pointing device may also be utilized in the joystick mode to transmit signals in the form of joystick data. That is, the host will receive signals that are processed as joystick data. By activating a device mode key, the operator may alternate between the pointing mode and the joystick mode. Accordingly, a single pointing device having the general configuration of a pointing device may be utilized to transmit both pointing data and joystick data. As an alternative, a joystick device may be configured to transmit both pointing data and joystick data.

One application for the pointing device relates to gaming applications, wherein the pointing device may be utilized in pointing mode to control a direction that the character is facing in the virtual environment, and the pointing device may be utilized in joystick mode to control the position of the character (i.e., move the character) in the virtual environment. By manipulating the pointing device, the operator will control whether the character looks upward, downward, or to the left or right in the virtual environment. In order to enter the joystick mode, the operator activates the device mode key and is then able to control the positioning of the character relative to objects and other characters in the virtual environment. By activating the device mode key again, the pointing device returns to pointing mode and the operator may control the direction that the character is facing in the virtual environment. The actions performed in each of the pointing mode and the joystick mode may vary depending upon the specific software application that the pointing device is used with.

Another feature of the pointing device is the presence of an center/hold key that places the pointing device in one of a center mode and a hold mode. When the pointing device is in the center mode, the computer ceases to operate upon joystick data when the operator switches the pointing device from the joystick mode to the pointing mode. That is, movement of the character in the virtual environment will cease upon switching the pointing device from the joystick mode to the pointing mode. When the pointing device is in the hold mode, however, the computer continues to operate upon joystick data when the operator switches the pointing device from the joystick mode to the pointing mode. That is, movement of the character in the virtual environment will continue upon switching the pointing device from the joystick mode to the pointing mode.

Illustrative Computing Environment

FIG. 1 illustrates a schematic diagram of a general-purpose digital computing environment that can be used to implement various aspects of the invention. In FIG. 1, a computer 100 includes a processing unit 110, a system memory 120, and a system bus 130 that couples various system components including the system memory 120 to the processing unit 110. The system bus 130 may be any of several types of bus structures including a memory bus or memory controller, a peripheral bus, and a local bus using any of a variety of bus architectures. The system memory 120 may include read only memory (ROM) 140 and random access memory (RAM) 150.

A basic input/output system 160 (BIOS), containing the basic routines that help to transfer information between elements within the computer 100, such as during start-up, is stored in the ROM 140. The computer 100 also may include a hard disk drive 170 for reading from and writing to a hard disk (not shown), a magnetic disk drive 180 for reading from or writing to a removable magnetic disk 190, and an optical disk drive 191 for reading from or writing to a removable optical disk 199, such as a CD ROM or other optical media. The hard disk drive 170, the magnetic disk drive 180, and the optical disk drive 191 are connected to the system bus 130 by a hard disk drive interface 192, a magnetic disk drive interface 193, and an optical disk drive interface 194, respectively. These drives and their associated computer-readable media provide nonvolatile storage of computer-readable instructions, data structures, program modules, and other data for the personal computer 100. It will be appreciated by those skilled in the art that other types of computer-readable media that can store data that is accessible by a computer, such as magnetic cassettes, flash memory cards, digital video disks, Bernoulli cartridges, random access memories (RAMs), read only memories (ROMs), and the like, may also be used in the example operating environment.

A number of program modules can be stored on the hard disk drive 170, the magnetic disk 190, the optical disk 199, the ROM 140, or the RAM 150, including an operating system 195, one or more application programs 196, other program modules 197, and program data 198. A user can enter commands and information into the computer 100 through input devices, such as a keyboard 101 and pointing device 102 (such as a mouse). Other input devices (not shown) may include a microphone, joystick device, game pad, satellite dish, scanner, or the like. These and other input devices are often connected to the processing unit 110 through a serial port interface 106 that is coupled to the system bus 130, but they also may be connected by other interfaces, such as a parallel port, game port, or a universal serial bus (USB), and the like. Further still, these devices may be coupled directly to the system bus 130 via an appropriate interface (not shown).

A monitor 107 or other type of display device also may be connected to the system bus 130 via an interface, such as a video adapter 108. In addition to the monitor 107, personal computers typically include other peripheral output devices (not shown), such as speakers and printers. In one example, a pen digitizer 165 and accompanying pen or stylus 166 are provided in order to digitally capture freehand input. Although a connection between the pen digitizer 165 and the serial port interface 106 is shown in FIG. 1, in practice, the pen digitizer 165 may be directly coupled to the processing unit 110, or it may be coupled to the processing unit 110 in any suitable manner, such as via a parallel port or another interface and the system bus 130 as is known in the art. Furthermore, although the digitizer 165 is shown apart from the monitor 107 in FIG. 1, the usable input area of the digitizer 165 may be co-extensive with the display area of the monitor 107. Further still, the digitizer 165 may be integrated in the monitor 107, or it may exist as a separate device overlaying or otherwise appended to the monitor 107.

The computer 100 can operate in a networked environment using logical connections to one or more remote computers, such as a remote computer 109. The remote computer 109 can be a server, a router, a network PC, a peer device or other common network node, and it typically includes many or all of the elements described above relative to the computer 100, although for simplicity, only a memory storage device 111 has been illustrated in FIG. 1. The logical connections depicted in FIG. 1 include a local area network (LAN) 112 and a wide area network (WAN) 113. Such networking environments are commonplace in offices, enterprise-wide computer networks, intranets, and the Internet, using both wired and wireless connections.

When used in a LAN networking environment, the computer 100 is connected to the local area network 112 through a network interface or adapter 114. When used in a WAN networking environment, the personal computer 100 typically includes a modem 115 or other means for establishing a communications link over the wide area network 113, such as the Internet. The modem 115, which may be internal or external to the computer 100, may be connected to the system bus 130 via the serial port interface 106. In a networked environment, program modules depicted relative to the personal computer 100, or portions thereof, may be stored in the remote memory storage device.

It will be appreciated that the network connections shown are examples and other techniques for establishing a communications link between the computers can be used. The existence of any of various well-known protocols such as TCP/IP, Ethernet, FTP, HTTP, UDP, and the like is presumed, and the system can be operated in a user-server configuration to permit a user to retrieve web pages from a web-based server. Any of various conventional web browsers can be used to display and manipulate data on web pages.

Although the FIG. 1 environment shows an illustrative environment, it will be understood that other computing environments also may be used. For example, one or more examples of the invention may use an environment having fewer than all of the various aspects shown in FIG. 1 and described above, and these aspects may appear in various combinations and subcombinations that will be apparent to one of ordinary skill.

Pointing Device Discussion

Figure 2A:
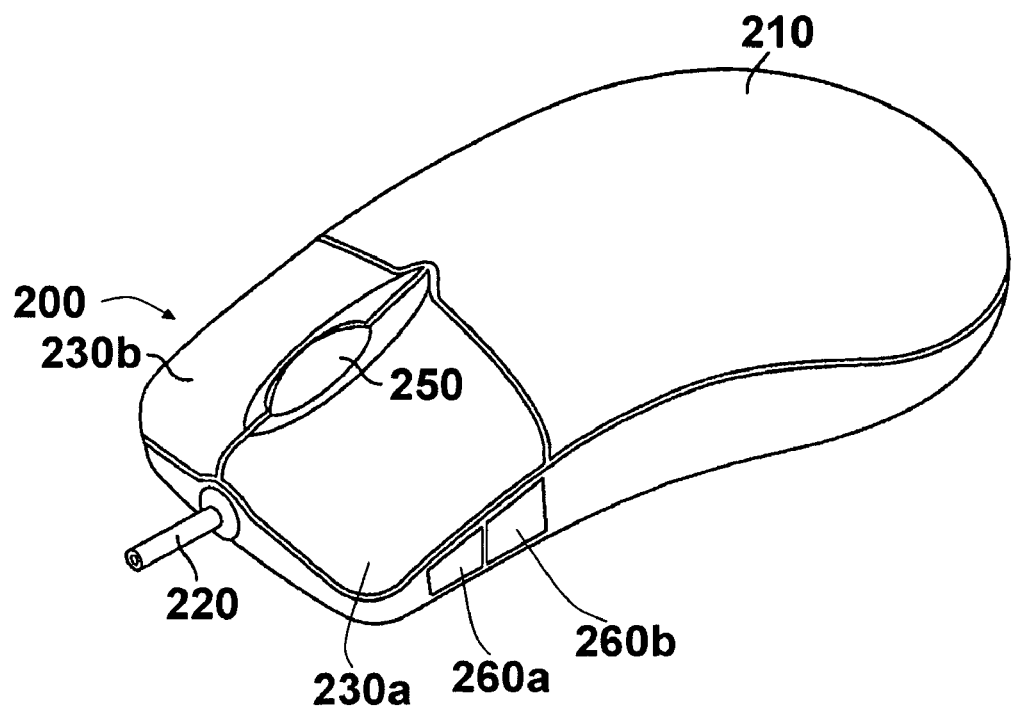
FIG. 2A is a perspective view of a first input device incorporating various aspects of the invention.
Figure 2B:
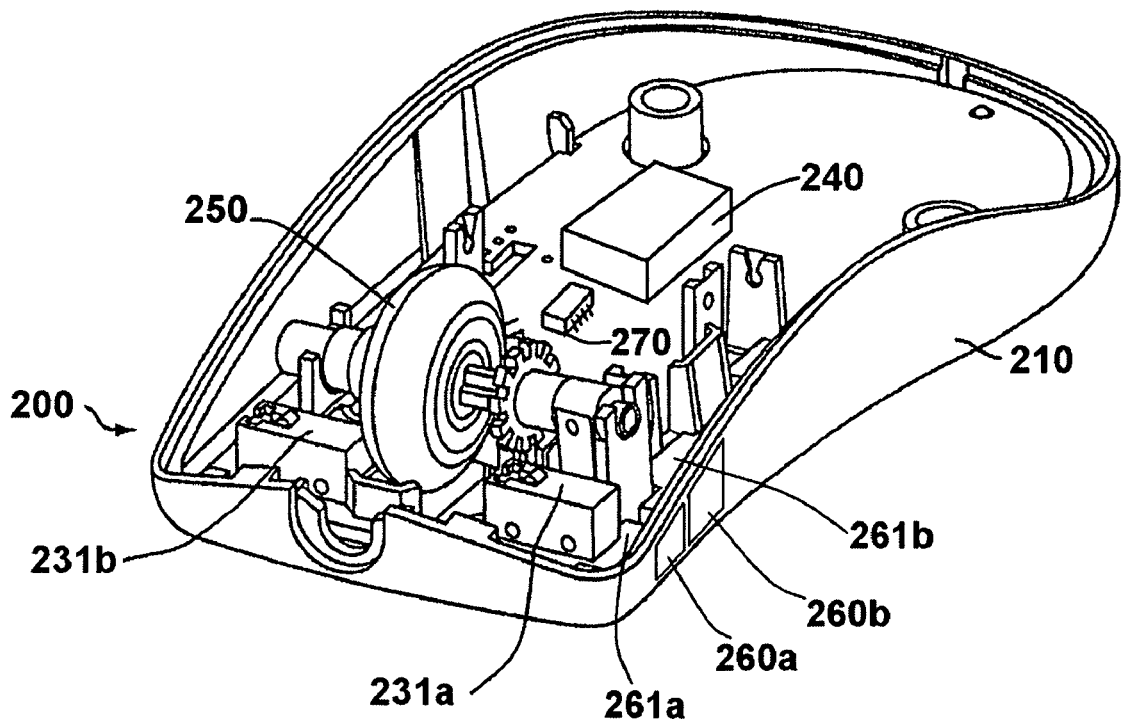
FIG. 2B is a cut away perspective view of the first input device.

The pointing device 102 associated with the computer 100 may exhibit the general configuration of any conventional pointing device, including a mouse, trackball, or touchpad, for example. A pointing device 200 is depicted in FIGS. 2A and 2B as a mouse-style pointing device. As is well-known in the art, a purpose of the pointing device 200 includes moving a pointer image to manipulate virtual objects, such as buttons, icons, hypertext links, or data associated with an image rendered on a display screen. When utilized in the context of a gaming application, for example, pointing device 200 may also be utilized to control various movements, such as the actions of a character or panning of a virtual environment.

A housing 210 forms a portion of an exterior of the pointing device 200 and has a configuration that interfaces with a hand of the user. A cord 220 extends from a front portion of the housing 210 and is utilized to transmit signals from the pointing device 200 to the computer 100. The signals that are transmitted through the cord 220 are typically generated in response to operator manipulation of a primary key 230a, a secondary key 230b, a rotatable wheel 250, a device mode key 260a, or an center/hold key 260b. The signals may also be generated in response to movement of the pointing device 200 relative to a support surface, as detected by a tracking assembly 240.

The primary key 230a and the secondary key 230b each have a depressible structure and are associated with a pair of switches 231a and 231b that are positioned within the housing 210. Accordingly, the primary key 230a may be depressed by the operator to activate the switch 231a, thereby generating a signal that is transmitted to the computer 100. Similarly, the secondary key 230b may be depressed by the user to activate the switch 231b. The rotatable wheel 250 may be both depressible and rotatable to generate signals that are transmitted to the computer 100. In a manner that is similar to the keys 230a and 230b, the device mode key 260a and the center/hold key 260b each have a depressible structure and are associated with a pair of switches 261a and 261b that are positioned within the housing 210. Accordingly, the keys 260a and 260b may be depressed by the operator to respectively activate the switches 261a and 261b, thereby generating signals that are transmitted to the computer 100.

The tracking assembly 240 detects translational displacement of the pointing device 200 relative to a support surface upon which the pointing device 200 rests. The tracking assembly 240 is depicted as an optical-based arrangement that detects displacement of the pointing device 200 and transmits a corresponding signal to the computer 100. In general, the tracking assembly 240 has the configuration of an optical sensor system that is disclosed in U.S. Pat. No. 6,172,354 to Adan et al. One skilled in the relevant art will recognize, however, that other suitable optical sensing systems may be utilized within the scope of the invention. As an alternative, the tracking assembly 240 may incorporate a rotatable ball, as is known in the art, that rotates in response to movement of the pointing device 200, thereby generating a signal that is transmitted to the computer 100. In further aspects of the invention, a similar tracking assembly may be utilized to detect rotation of a ball in a trackball pointing device, or a touch-sensitive pad may be utilized as the tracking assembly in a touchpad pointing device.

In addition to the elements discussed above, the pointing device 200 may include a controller 270 that processes the signals from the primary key 230a, the secondary key 230b, the tracking assembly 240, the rotatable wheel 250, the device mode key 260a, and the center/hold key 260b. Controller 270 then transmits corresponding data to computer 100 through the cord 220.

Figure 2C:
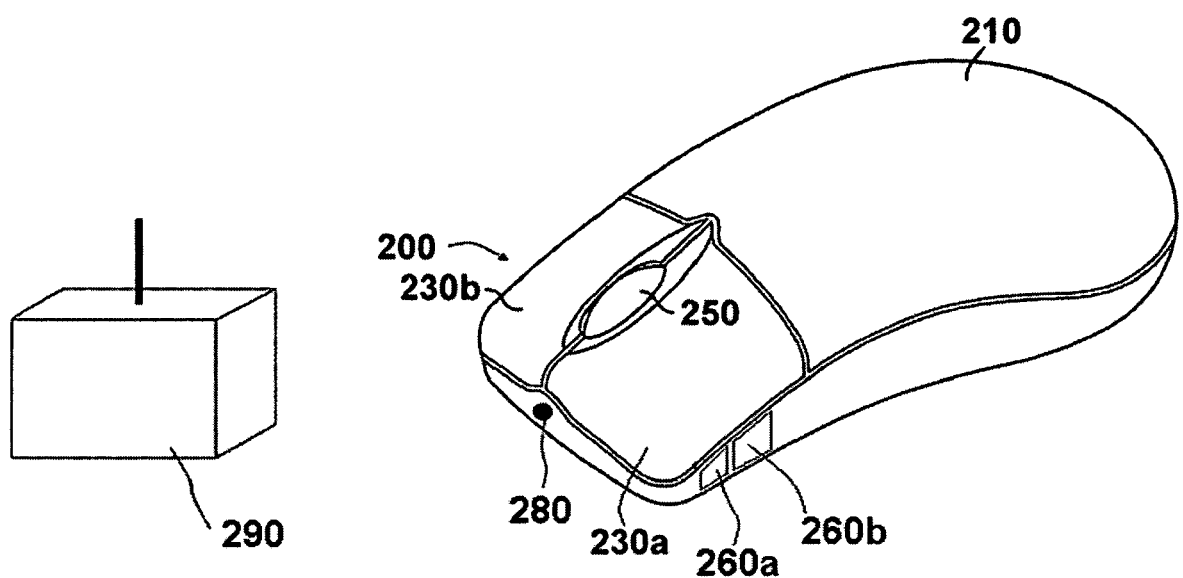
FIG. 2C is a perspective view of a second input device incorporating various aspects of the invention.

The specific configuration of the pointing device 200 may vary significantly. In addition to the keys 230a, 230b, 260a, and 260b the pointing device 200 may also include other keys that are depressible or touch-sensitive, for example. As an alternative to the cord 220, a conventional wireless connection between the pointing device 200 and the computer 100 may also be utilized, as depicted in FIG. 2C. When a conventional wireless connection is utilized, the pointing device 200 incorporates a transmitter 280 that transmits signals to a receiver 290 associated with the computer 100. That is, signals generated by the keys 230a and 230b, the tracking assembly 240, the rotatable wheel 250, and the keys 260a and 260b are transmitted by the transmitter 280 to the receiver 290 and subsequently sent to the computer 100.

The pointing device 200 may have the configuration of a universal serial bus (USB) device. When hardware conforming to USB protocols is connected to a computer, information is exchanged between the hardware and the computer. More particularly, the hardware initially transmits information to the computer to identify the hardware. If the hardware is a pointing device, for example, information identifying the hardware as a pointing device will be transmitted to the computer. Similarly, if the hardware is a joystick, information identifying the hardware as a joystick will be transmitted to the computer. Upon connection of the pointing device 200 to the computer 100, the pointing device 200 transmits signals to the computer 100 to identify the pointing device 200 as a pointing device and a joystick. More particularly, the controller 270 transmits a pointing device recognition signal and a joystick device recognition signal to the computer 100 upon connection of the pointing device 200 to the computer 100. From the perspective of the computer 100, therefore, both a pointing device and a joystick are connected. Accordingly, pointing data and joystick data may be sent by the pointing device 200 to the computer 100, and the pointing data and joystick data will be recognized by the computer 100.

Use of the Pointing Device

The pointing device 200 may be utilized to move a pointer image and manipulate virtual objects, such as buttons, icons, hypertext links, or data associated with an image rendered on a display screen. When utilized in the context of a gaming application, for example, the pointing device 200 may also be utilized to control various movements, such as the actions of a character or a virtual environment. For purposes of the following discussion, the pointing device 200 will be discussed as having (a) a pointing mode in which the pointing device 200 transmits pointing data, and (b) a joystick mode in which the pointing device 200 transmits joystick data. As an example, when in the pointing mode, the pointing device 200 may be utilized to control a direction that the character is facing in the virtual environment. When in the joystick mode, however, the pointing device 200 may be utilized to control the position of the character in the virtual environment.

The tracking device 240 detects movement of the pointing device 200 relative to a support surface and transmits a corresponding signal to the controller 270. The controller 270 then processes the signal and determines whether the pointing device 200 is in the pointing mode or the joystick mode. If the pointing device 200 is in the pointing mode, the controller 270 transmits corresponding pointing data to the computer 100. Accordingly, when the operator sets the pointing device 200 to be in the pointing mode and moves the pointing device 200 relative to the support surface, the pointing device 200 transmits pointing data to the computer 100. In the context of gaming applications, the pointing data will control a direction that the character is facing in the virtual environment.

If the pointing device 200 is in the joystick mode, the controller 270 transmits corresponding joystick data to the computer 100. Accordingly, when the operator sets the pointing device 200 to be in the joystick mode and moves the pointing device 200 relative to the support surface, the pointing device 200 transmits joystick data to the computer 100. In the context of gaming applications, the pointing data will control the position of the character in the virtual environment.

In order to switch between the pointing mode and the joystick mode, the operator depresses or otherwise activates the device switch button 260a. If, for example, the pointing device 200 is in the pointing mode and the operator activates the device switch button 260a, then the pointing device 200 will switch to the joystick mode. If the operator again activates the device switch button 260a, then the pointing device 200 will return to the pointing mode. Accordingly, the device switch button 260a toggles the pointing device 200 between the pointing mode and the joystick mode.

Situations may arise where the operator desires the computer 100 to continue operating upon joystick data even when the pointing device 200 is in the pointing mode. For example, the operator may desire to move the character in a specific direction in the virtual environment, and change the direction that the character faces while the character is moving in the virtual environment. In order to accomplish this, the computer continues to operate upon the joystick data (to induce movement in the character) when the pointing device 200 is in the pointing mode and transmits pointing data (to change the direction the character is facing). As will be described below, the operator may accomplish this task with the center/hold key 260b, which toggles the pointing device 200 between a center mode and a hold mode.

A conventional joystick device has a base and a joystick extending vertically from the base. The joystick is rotatable relative to the base. That is, the joystick may be moved from a vertical position to an inclined position by the operator. When the operator releases the joystick, a spring system returns the joystick to the vertical, centered position. Signals are transmitted when the joystick is in an inclined position. Accordingly, moving the joystick forward may induce the character in a gaming application to move forward in the virtual environment, and moving the joystick sideways may induce the character to move sideways. When the joystick is released, however, the spring system centers the joystick and movement of the character ceases.

In a situation where a joystick device and a pointing device are both utilized by the operator, the joystick device may be held in an inclined position while the mouse is being manipulated. In the context of a gaming application, for example, the operator could hold the joystick device in a position that induces the character to move in the virtual environment, and the operator could simultaneously manipulate the pointing device to control a direction that the character is facing in the virtual environment. A similar option is available with pointing device 200. More particularly, the operator may depress or otherwise activate center/hold key 260b to toggle between the center mode and the hold mode. In the center mode, the computer 100 ceases to operate upon the joystick data when the pointing device 200 is switched from joystick mode to pointing mode. Accordingly, when in center mode, movement of the character due to use of the pointing device 200 in the joystick mode ceases when the operator has switched to pointing mode. In the hold mode, however, the computer 100 continues to operate upon the joystick data when the operator has exited the joystick mode and entered the pointing mode. Accordingly, when in hold mode, the last movement of the character due to use of the pointing device 200 in the joystick mode continues even when the operator has switched to pointing mode.

If the pointing device 200 is in pointing mode and hold mode, movements of the pointing device 200 induce pointing data to be sent to the computer 100. In the context of a gaming application, this changes the direction that the character faces in the virtual environment. Because the pointing device 200 is in the hold mode, the character also moves in the virtual environment in the direction that the character moved when the pointing device 200 was switched from the joystick mode to the pointing mode. In order to cease movement of the character, the operator may activate center/hold key 260b, which changes the pointing device 200 from the hold mode to the center mode.

System Discussion

Figure 3:
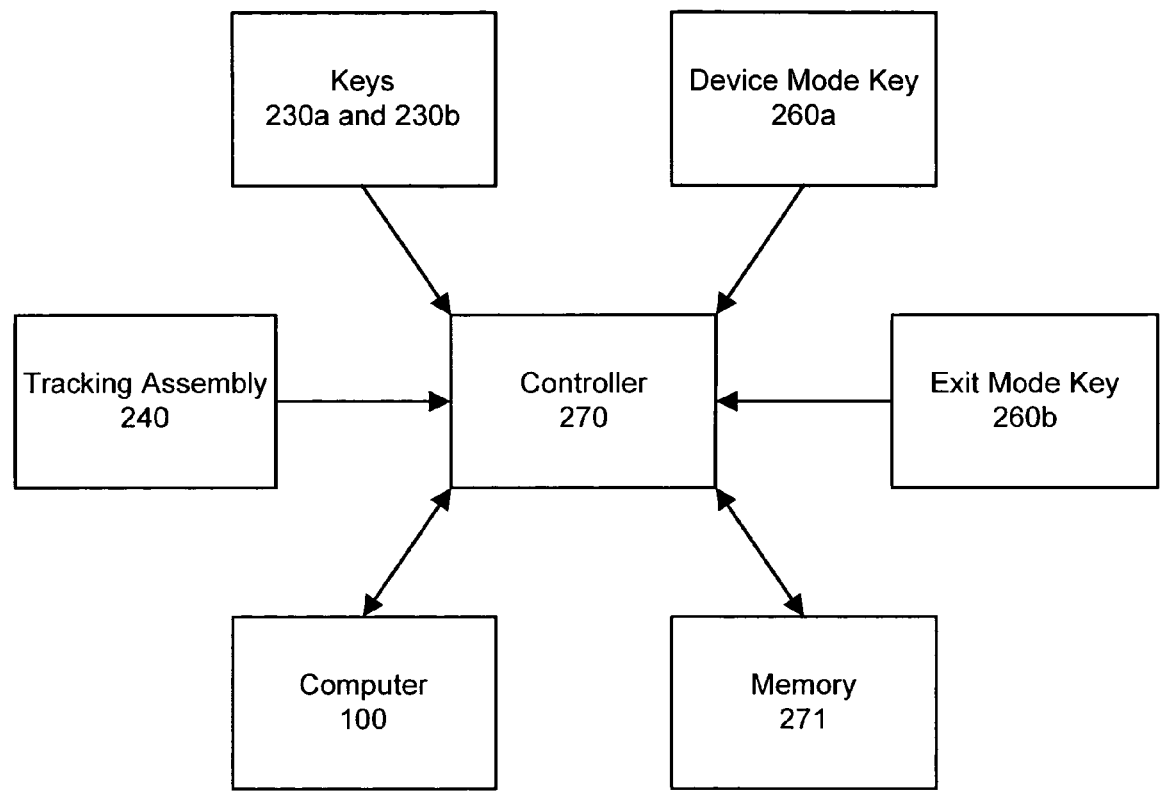
FIG. 3 is a schematic diagram of a system in which various aspects of the invention may be implemented.

With reference to FIG. 3, an illustrative system incorporating aspects of the invention is disclosed. The system includes the keys 230a and 230b, the tracking assembly 240, the device mode key 260a, and the exit mode key 260b, which are each capable of transmitting signals to the controller 270. That is, the keys 230a and 230b will transmit a signal to the controller 270 when depressed or otherwise activated. Similarly, each of the tracking assembly 240, the device mode key 260a, and the exit mode key 260b will transmit a signal to the controller 270 when activated. The controller 270 processes signals from the keys 230a and 230b, the tracking assembly 240, the device mode key 260a, and the exit mode key 260b and transmits an appropriate signal to the computer 100. Selected signals may be stored by the controller 270 in a memory 271.

Aspects of the invention may be implemented through hardware or software. That is, the pointing device 200 may incorporate hardware that operates in the manner described above. More particularly, the controller 270, which is located within the pointing device 200, may be responsible for detecting signals from the keys 230a and 230b, the tracking assembly 240, the device mode key 260a, and the exit mode key 260b and transmitting appropriate signals to the computer 100. An advantage of this scenario is that no additional software is necessary for the computer 100. As an alternative, however, the functions of the controller 270 may be incorporated into the software of the computer 100. That is, signals from the keys 230a and 230b, the tracking assembly 240, the device mode key 260a, and the exit mode key 260b may be transmitted directly to the computer 100. An advantage of this scenario, is that a conventional pointing device may be utilized as the pointing device 200. Accordingly, the manner in which aspects of the invention are implemented may vary significantly.

Method Discussion

Figure 4:
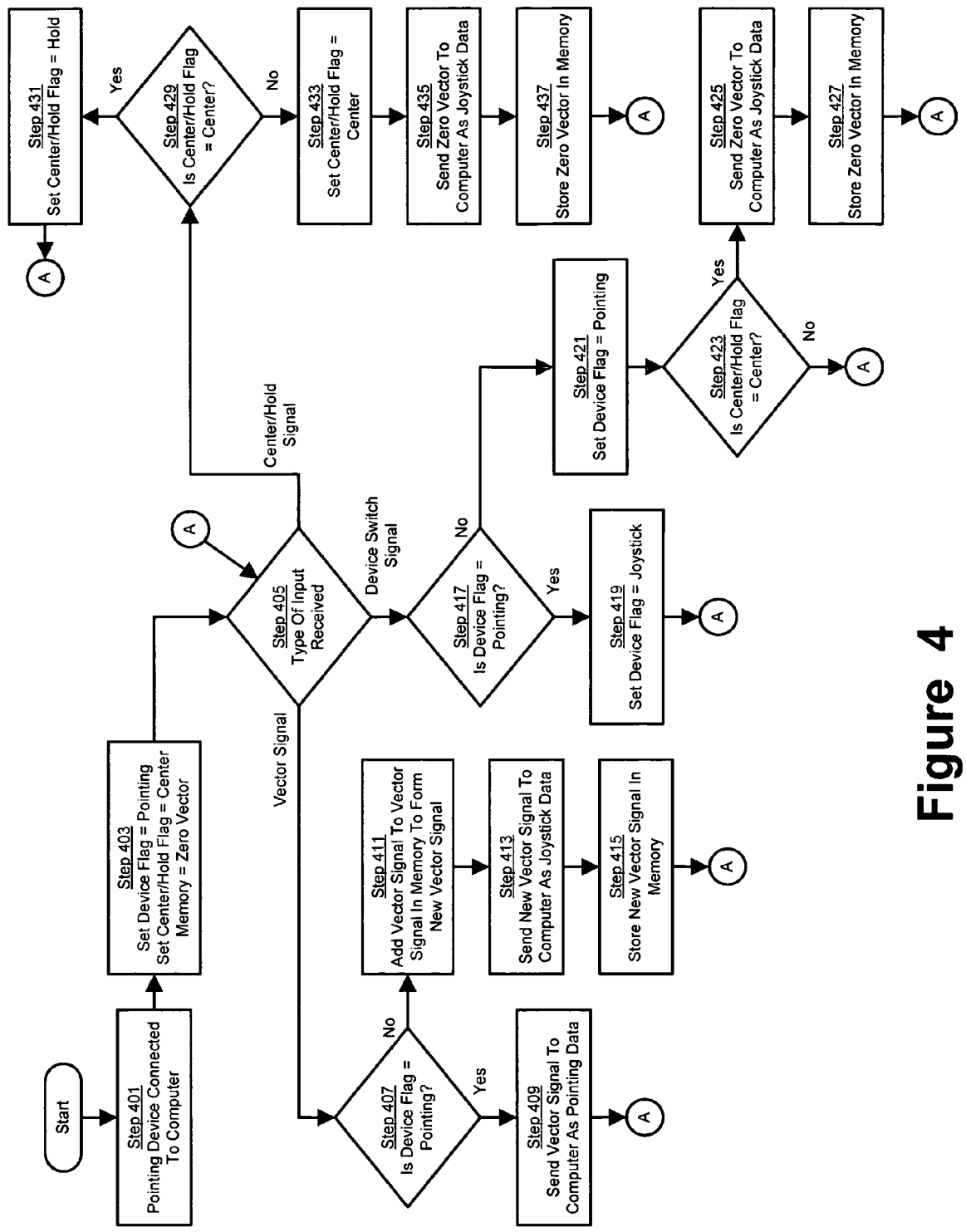
FIG. 4 is a flow diagram illustrating a method according to various examples of the invention.

An enhanced understanding of the system discussed above may be gained through reference to FIG. 4, which discloses a flow diagram illustrating steps performed in executing various aspects of the invention. Initially, the pointing device 200 is connected to the computer 100 (Step 401). Upon connection of the pointing device 200 to the computer 100, the pointing device 200 transmits signals to the computer 100 to identify the pointing device 200 as a pointing device and a joystick. More particularly, the controller 270 transmits a pointing device recognition signal and a joystick device recognition signal to the computer 100 upon connection of the pointing device 200 to the computer 100. From the perspective of the computer 100, therefore, both a pointing device and a joystick are connected.

Various flags are utilized to reference the state of the pointing device 200, including a device flag and an center/hold flag. A state of the device flag determines whether the pointing device 200 is in pointing mode or joystick mode. From a software perspective, a zero or one is generally utilized to reflect the state of a flag. For purposes of discussion, however, the device flag may be set to (1) "pointing" to indicate that the pointing device 200 is in the pointing mode and (2) "joystick" to indicate that the pointing device 200 is in the joystick mode. Similarly, the center/hold flag may be set to (1) "center" to indicate that the pointing device 200 is in the center mode and (2) "hold" to indicate that the pointing device 200 is in the hold mode.

Following connection of the pointing device 200 to the computer 100, the pointing device 200 is initialized such that the device flag is set to pointing and the center/hold flag is set to center. In addition, a vector signal with a magnitude of zero (hereafter referred to as a zero vector) is stored in memory 271 (Step 403). When an input signal is received (Step 405), the system determines the type of input signal. For purposes of the present discussion, three types of input signals may be received: a vector signal, a device switch signal, and a center/hold signal. The vector signal is received upon activation of the tracking assembly 240, which occurs when the pointing device 200 is moved relative a support surface. The vector signal incorporates direction data and magnitude data that characterize the movement. In touchpad and trackball pointing devices, a similar signal is sent. The device switch signal and the center/hold signal are respectively received upon activation of the device mode key 260a and the exit mode key 260b.

When a vector signal is received, the system determines whether the device flag is set to pointing (Step 407). If the device flag is set to pointing, then the vector signal is sent to the computer 100 as pointing data (Step 409). If the device flag is not set to pointing (i.e., the device flag is set to joystick), however, then the vector signal is added to the vector signal that is stored in the memory 271 to form a new vector signal (Step 411). The new vector signal is then sent to the computer 100 as joystick data (Step 413) and the new vector signal is stored in the memory 271 (Step 415). When a joystick is moved from center, a vector signal corresponding to the movement is sent to a computer. If the joystick is moved again without recentering the joystick, another vector signal corresponding to the movement is sent to a computer, and the two vector signals are added to determine the position of the joystick and movement of the character. When the joystick is returned to the center position, the vector signals add to a zero vector. Accordingly, Steps 411, 413, and 415 mimic the operation of a joystick, but with pointing device 200.

Steps 407 through 415 outline general steps that are performed when a vector signal is received from the tracking assembly 240. If the pointing device 200 is in pointing mode, then the vector signal is sent to the computer 100 as pointing data. If the pointing device is in joystick mode, however, then the vector signal is added to the vector signal in the memory 217 and sent to the computer 100 as joystick data. In addition, the new vector signal is stored in the memory 271.

Returning to Step 405, when a device switch signal is received (i.e., when the device mode key 260a is activated), the method determines whether the device flag is set to pointing (Step 417). If the device flag is set to pointing, then the device flag is changed to joystick (Step 419) and the method returns to Step 405. If the device flag is not set to pointing (i.e., the device flag is set to joystick), however, then the device flag is changed to pointing (Step 421). The system then determines whether the center/hold flag is set to center (Step 423). If the center/hold flag is not set to center (i.e., the center/hold flag is set to hold), then the system returns to Step 405. If the center/hold flag is set to center, then the system sends a zero vector to the computer 100 as joystick data (Step 425) and the zero vector is stored in the memory 271 (Step 427).

Steps 417 through 427 outline general steps that are performed when a device switch signal is received through activation of the device mode button key 260a. Regardless of whether the device flag is set to pointing or joystick, the device flag is changed. When the device flag is changed from pointing to joystick, subsequent vector signals will be sent to the computer 100 as joystick data (see Steps 411-415). When the device flag is changed from joystick to pointing, however, a determination is made as to whether the computer should continue to operate upon the joystick data that was previously sent, if any. If the center/hold flag is set to hold, then the computer 100 does continue to operate upon the joystick data and, for example, the character continues to move in the virtual environment. If the center/hold flag is set to center, however, a zero vector is sent to the computer 100 and stored in memory, thereby ceasing movement of the character.

Returning to Step 405, when an center/hold signal is received (i.e., when the exit mode key 260b is activated), the method determines whether the center/hold flag is set to center (Step 429). If the center/hold flag is set to center, then the center/hold flag is changed to hold (Step 431) and the method returns to Step 405. If the center/hold flag is not set to center (i.e., the center/hold flag is set to hold), however, then the center/hold flag is changed to center (Step 433). Accordingly, receipt of an center/hold signal changes the state of the center/hold flag.

Changing the center/hold flag has the effect of changing whether the computer 100 continues to operate upon last packet of joystick data that was sent to computer 100 as joystick data. If the pointing device 200 is in both pointing and hold mode, then the computer 100 does continue to operate upon the joystick data. If, however, the pointing device 200 is in both pointing and center, then the computer 100 ceases to operate upon the joystick data based upon Steps 421-427, for example.

Situations may arise where the operator desires the computer 100 to continue operating upon joystick data even when the pointing device 200 is in the pointing mode. For example, the operator may desire to move the character in a specific direction in the virtual environment, and change the direction that the character faces while the character is moving in the virtual environment. In order to accomplish this, the operator activates the device switch button 260a so as to place the pointing device 200 in joystick mode (Steps 417 and 419) and the operator activates the exit mode key 260b to place the pointing device 200 in hold mode. The operator then moves the pointing device 200 such that the tracking assembly 240 generates a vector signal, and the vector signal is sent to the computer 100 as joystick data (Steps 407, 411, 413, and 415). Once the character is moving in the desired direction, the operator may activate the device switch button 260a so as to place the pointing device 200 in pointing mode (Steps 417 and 421). Because the pointing device 200 is also in hold mode, the computer 100 will continue to operate upon the joystick data and move the character in the virtual environment. Subsequent movements of the pointing device 200 will then be transmitted as pointing data (Steps 407 and 409), thereby changing the direction that the character faces in the virtual environment.

The pointing device 200 is discussed above as including keys 260a and 260b in order to change the various modes of the input device 200. In some situations, a pointing device may not include such keys and either of keys 230a and 230b, for example, may be utilized to change the various modes of the input device. Although the pointing device 200 is discussed as a mouse-style pointing device, aspects of the invention may be accomplished through other types of pointing devices, including a trackball pointing device and a touchpad pointing device.

The invention is disclosed above and in the accompanying drawings with reference to a variety of embodiments. The purpose served by the disclosure, however, is to provide an example of the various features and concepts related to the invention, not to limit the scope of the invention. One skilled in the relevant art will recognize that numerous variations and modifications may be made to the embodiments described above without departing from the scope of the invention, as defined by the appended claims.

That which is claimed is:

1. An input device comprising:
   a housing that forms at least a portion of an exterior of the input device;
   a tracking assembly at least partially located within the housing, wherein the tracking assembly detects movement of the input device relative to a support surface;
   a first actuator accessible from the exterior of the input device, the first actuator switching the input device between a pointing mode and a joystick mode, the input device transmitting a pointing device signal when in the pointing mode and a joystick signal when in the joystick mode;
   a second actuator that switches the input device between a center mode and a hold mode, wherein a computer ceases to operate upon joystick data when the input device is in the center mode and switches from the joystick mode to the pointing mode, and wherein the computer continues to operate upon joystick data and proceeds to operate on pointing data when the input device is in the hold mode and switches from the joystick mode to the pointing mode, wherein the joystick data and the pointing data comprise data corresponding to movement of the input device relative to the support surface; and
   a controller located within the housing to receive input from the tracking assembly and the first actuator, the controller transmitting a pointing device recognition signal and a joystick device recognition signal to a host upon connection of the input device to the host.

2. The input device recited in claim 1, wherein the input device is a universal serial bus device.

3. The input device recited in claim 1, wherein the first actuator switches the input device between a pointing mode and a joystick mode, the input device transmitting pointing device signals when in the pointing mode and joystick signals when in the joystick mode in response to movement of the input device relative to the support surface.

4. The input device recited in claim 1, wherein the input device includes a primary key and a secondary key, the first actuator being separate from the primary key and the secondary key.

5. An input device comprising:
   a housing that forms at least a portion of an exterior of the input device;
   a tracking assembly at least partially located within the housing;
   a first actuator accessible from the exterior of the input device, the first actuator switching the input device between a pointing mode and a joystick mode, the input device transmitting a pointing device signal when in the pointing mode and a joystick signal when in the joystick mode; and
   a second actuator accessible from the exterior of the input device, the second actuator switching the input device between a center mode and a hold mode, wherein a computer ceases to operate upon joystick data when the input device is in the center mode and switches from the joystick mode to the pointing mode, wherein the computer continues to operate upon joystick data and proceeds to operate on pointing data when the pointing device is in the hold mode and switches from the joystick mode to the pointing mode, wherein the joystick data and the pointing data comprise data corresponding to movement of the input device relative to a support surface.

6. The input device recited in claim 5, wherein the input device includes a controller located within the housing to receive input from the tracking assembly, the first actuator, and the second actuator.

7. The input device recited in claim 5, wherein the input device includes a controller located within the housing, the controller transmitting a pointing device recognition signal and a joystick device recognition signal to a host upon connection of the input device to the host.

8. The input device recited in claim 5, wherein the input device is a universal serial bus device.

9. The input device recited in claim 5, wherein the tracking assembly detects movement of the input device relative to a support surface.

10. The input device recited in claim 5, wherein the input device includes a primary key and a secondary key, the first actuator and the second actuator being separate from the primary key and the secondary key.

11. A method of operating an input device having a joystick mode and a pointing mode, comprising:
   receiving a first signal that is one of a center signal and a hold signal;
   receiving a second signal that is one of a joystick signal and a pointing signal that each comprise data corresponding to movement of the input device relative to a support surface, wherein:
      upon receiving the joystick signal, receiving a joystick vector signal and operating upon the joystick vector signal to move an object in a first direction in a virtual environment, the joystick vector signal being stored in a memory; and upon receiving the pointing signal, receiving a pointing vector signal and operating upon the pointing vector signal to change a view of the virtual environment; and receiving a device switch signal that toggles the second signal, wherein:

upon toggling the second signal from the joystick signal to the pointing signal, receiving a pointing vector signal and operating upon the pointing vector signal to change a view of the virtual environment, and (1) continuing to operate upon the joystick vector signal to move the object in the first direction in the virtual environment if the first signal is the hold signal, and (2) ceasing to operate upon the joystick vector signal if the first signal is the center signal; and upon toggling the second signal from the pointing signal to the joystick signal, receiving a joystick vector signal and operating upon the joystick vector signal to move an object in a second direction in a virtual environment, the joystick vector signal being stored in a memory.

12. The method recited in claim 11, wherein a pointing device includes a controller, the controller receiving the first signal, the joystick vector signal, the device switch signal, and the pointing vector signal, and the controller transmitting the joystick vector signal.

13. A computer readable medium having computer-executable instructions for performing the method recited in claim 11.

* * * * *